July 1, 1958 C. V. SHELTON 2,841,251
BRAKE ACTUATING MECHANISM
Filed Aug. 8, 1955

CHARLES V. SHELTON,
INVENTOR.

BY William P. Green
ATTORNEY.

United States Patent Office 2,841,251
Patented July 1, 1958

2,841,251

BRAKE ACTUATING MECHANISM

Charles V. Shelton, Long Beach, Calif.

Application August 8, 1955, Serial No. 526,890

7 Claims. (Cl. 188—106)

This invention relates to improved braking apparatus which is particularly adapted in certain respects for use as a safety braking mechanism for motor vehicles.

In driving automobiles and other motor vehicles, many accidents have been caused by failure of the brakes to hold at a critical moment, with the result that the driver loses control of the vehicle and cannot stop it short of a collision. One important object of the present invention is to provide an improved safety arrangement which is capable of automatically mechanically applying the brakes if the primary hydraulic or pneumatic system fails, as for instance if a leak develops in the hydraulic fluid system. Preferably, the device is also adapted for actuation by the usual hand operated emergency brake control element. Particularly contemplated is an arrangement of this type which is so designed as to allow for self energization of the brake when operated by the present mechanism, and with the vehicle traveling in either forward or reverse direction. Also, the present brake applying mechanism is considerably simpler than prior similar arrangements, and is of a construction lending itself easily to complete sealing of the apparatus against the admission of dust or dirt to the various working parts.

The present actuating mechanism is particularly applicable to brakes of a well known type employing two shoes which are free to float or shift within the brake drum to attain the desired self energization. In accordance with the invention, I provide in such a brake a hollow stop structure which is received between the ends of the two shoes to prevent their rotation with the drum, and which contains a wedge element operable to displace the two shoes relatively apart and against the drum. Of particular importance is the unique mounting of this wedge element for lateral shifting movement, in addition to its shoe actuating movement, in a manner allowing either of the shoes to engage against the hollow stop member while the other is actuated away from the stop member and to braking position by the wedge element. As will appear, it is this lateral shifting movement which permits self energization of the brake when turning in either direction.

The wedge element may be movable axially within the stop member by means of a flexible cable extending to the outside of the brake mechanism. Preferably, the wedge element acts against the shoes through a pair of pins or actuating elements movably extending through a pair of openings in opposite side walls of the hollow stop member.

The above and other features and objects of the present invention will be better understood from the following detailed description of the typical embodiment illustrated in the accompanying drawing in which.

Figure 3:
Fig. 3 is a further enlarged fragmentary section taken on line 3—3 of Fig. 2.
Figure 6:
Figure 4:
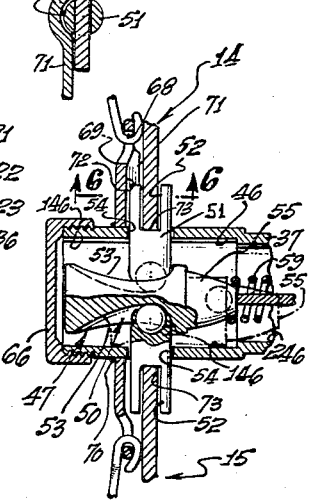
Figure 4:
Figure 5:
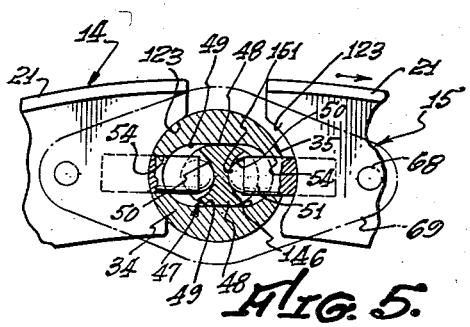

Figs. 4 and 5 are fragmentary sections taken on lines 4—4 and 5—5 respectively of Fig. 3;

Fig. 6 is an enlarged transverse section taken on line 6—6 of Fig. 4; and

Figure 7:
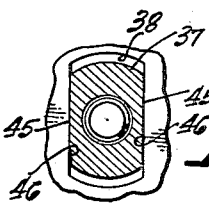
Figure 7:

Fig. 7 is a fragmentary section taken on line 7—7 of Fig. 3.

Figure 1:
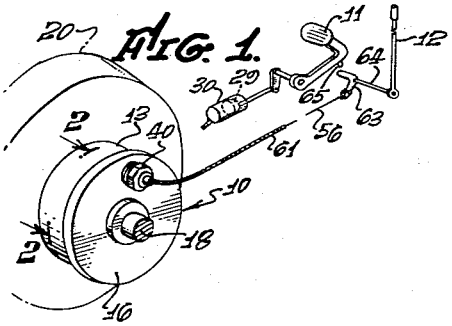
Fig. 1 is a fragmentary perspective view of an automobile brake system embodying the invention.

Referring first to Fig. 1, I have shown at 10 an automobile brake unit adapted for actuation by the usual pivotally mounted pedal 11, and by a hand operated emergency control typically represented as a swinging arm 12. As seen best in the interior view of Fig. 2, the brake unit 10 includes the usual cylindrical brake drum 13, within which are mounted a pair of shoes 14 and 15, which are movable radially outwardly into frictional braking engagement with the drum. Extending across an inner side of the drum and shoes, is an annular transverse mounting plate or wall 16, which is stationarily mounted to the frame or other wheel mounting portion of the vehicle by a number of bolts 17. An axle 18 extends through a central opening 19 in mounting plate 16, and carries the usual rotatable vehicle wheel 20. Brake drum 13 rotates with the wheel, while shoes 14 and 15 are retained against rotation, so that movement of the shoes radially outwardly against the drum acts to frictionally brake the drum and wheel against rotation.

The two shoes 14 and 15 include partial cylindrical outer portions 21, drum engaging linings 22 of friction material, and radially inwardly extending web portions 23. At their lower ends the two shoes are attached together by an adjustable length connection 24 for relative swinging movement toward and away from braking engagement with drum 13. This adjustable length connection may be pivotally attached to the webs of the two shoes at its opposite ends 25 and 26. A spring 27 yieldingly urges the shoe webs toward one another at a point above connection 24. Shoes 14 and 15 are actuated outwardly against drum 13 by a hydraulic piston and cylinder unit 28, in response to the actuation of a piston 29 within master cylinder 30 by depression of pedal 11 through a predetermined normal range of movement. The shoes are normally yieldingly urged in a retracting direction radially inwardly away from drum 13 by a pair of individual coil springs 31 and 32.

The apparatus thus far described is conventional and the same as that currently in use on most automobiles and other motor vehicles. I will now proceed to describe the portions of the apparatus which differ from conventional braking systems.

To prevent the shoes from rotating with the drum, the upper end portions of the webs 23 of shoes 14 and 15 have circularly curved end surfaces 123 which engage opposite sides of a stationary stop member 34. This member 34 is connected into and fastened against movement relative to mounting plate 16, and projects outwardly from that plate parallel to the axis $a$ of the brake mechanism. The portion of the stop member 34 which projects from plate 16 has an externally cylindrical surface 35, whose curvature corresponds to the curvature of end surfaces 123 of the web 23, to engage those end surfaces along an extended arcuate area.

Figure 2:
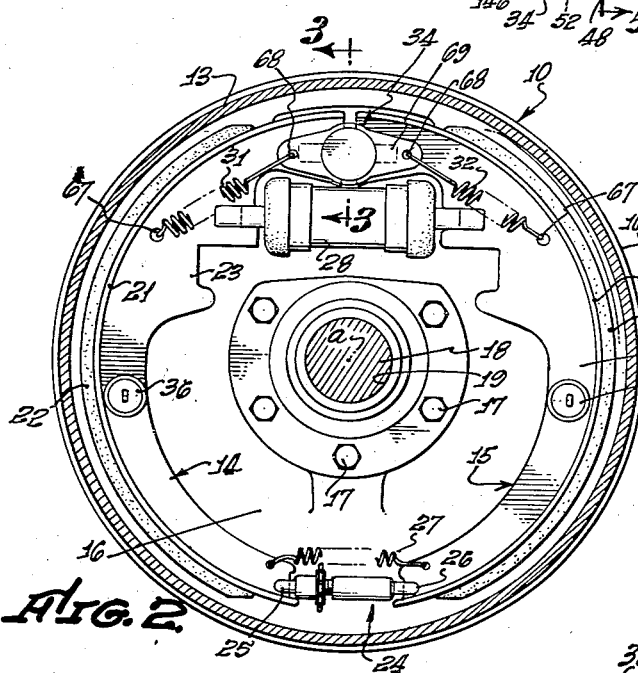
Fig. 2 is an enlarged section taken through the Fig. 1 brake mechanism.

When drum 13 is turning in a clockwise direction as seen in Fig. 2, the shoes are held against rotation by abutment of the upper end of shoe 14 against the left side of stop member 34, while piston and cylinder mechanism 28 acts to hydraulically actuate the upper end of shoe 15 away from engagement with stop member 34, so that the brake has a self energizing action. Conversely, when the direction of rotation of drum 13 is in a counterclockwise direction, shoe 15 abuts directly against member 34, while the floating piston and cylinder mechanism 28 actuates shoe 14 away from the stop member, so that the brake apparatus is still self energizing. In order to allow for such shifting movement of the shoes within the drum, the shoes are fastened to the plate 16 by a pair of spring retainer units 36, of known construction, which permit the shoes to shift laterally (transversely of axis $a$) through a limited range of movement relative to plate 16.

Stop member 34 has a reduced diameter portion 37 extending through an aperture 38 in plate 16 (see Fig. 3) and carrying an outer threaded portion 39 onto which a nut 40 is tightenable to rigidly attach member 35 to plate 16. A rigid spacing and reinforcing member 41 may extend across the inner side of plate 16, and contain an aperture 42 through which the reduced diameter portion 38 of element 34 extends. Member 34 has a transverse shoulder 43 tightenable against member 41 by tightening of nut 40. A number of washers 44, one of which may be a lock washer, are disposed about element 34 outwardly of plate 16. As seen in Fig. 7, the reduced diameter portion 37 of element 34 may have a pair of flat sides 45 engageable against flat sides 46 of apertures 38 and 42, while aperture 38 preferably has a somewhat greater vertical extent than does portion 37 of element 34 to allow for slight initial adjustment of element 34 radially of the brake.

Member 34 is hollow and essentially tubular, there being an inner recess or passage 46 extending entirely through member 34. This recess 46 has a somewhat enlarged portion 146 within the enlarged diameter portion 35 of element 34, and has a reduced width portion 246 within the reduced portion 37 of element 34, leading into a still smaller portion 346 within the threaded portion 39 of element 34.

The enlarged portion 146 of passage 46 contains a wedge element 47 which is movable essentially axially within member 34, and which acts by such axial movement to actuate shoes 14 and 15 relatively apart when the primary actuating unit 28 fails, or when the emergency lever 12 is operated. Element 47 may have the essentially circular transverse sectional configuration represented in Fig. 5, desirably having short flat surfaces 48 at its upper and lower sides engageable with flat top and bottom walls 49 of recess 46, to retain element 47 against rotation within recess 46. At its opposite sides, element 47 contains a pair of recesses 50, into which there project the rounded ends of two actuating pins 51, whose outer ends contain slots 52 receiving the end portions of the shoe webs 23. Wedge recesses 50 have inner wedge walls 53, which diverge relatively apart as they extend away from the location of plate 16, so that axial movement of element 47 to the right as seen in Fig. 4 serves to wedge pins 51 and the engaged upper ends of the shoes relatively apart, to bring the shoes into braking engagement with drum 13. Pins 51 extend through and are slidably movable within a pair of circular apertures 54 in the wall of element 34, which apertures are of a diameter slightly greater than the diameter of the cylindrical pins 51, to effectively guide those pins for only axial movement. The inner rounded end of each pin 51 may be integral with the rest of the pin, or may be formed separately as a ball bearing 151 which is rotatable relative to the rest of the pin as the wedge element moves.

Element 47 may have a reduced dimension portion 55 which is movable at least partially into the reduced dimension portion 246 of recess 46 when element 47 is actuated to the right as seen in Figs. 3 and 5. The element 47 is actuated to the right by the exertion of pulling force on a flexible actuating cable 56, having an enlargement 57 which is received within a retaining recess or slot 58 in element 47. A coil spring 59 within the portion 246 of recess 46, and bearing at its opposite ends against a shoulder 60 and element 47, acts to yieldingly resist rightward actuation of element 47 by the cable. At the outside of the brake, cable 56 extends through a curving guide conduit 61 of conventional construction, which conduit may be connected to threaded portion 39 of element 34 in hermetically sealed relation by means of a conventional compression fitting 62, the conduit itself also preferably being hermetically sealed.

Cable 56 is connected to pedal 11 by a suitable mechanical linkage in a manner such that after movement of the pedal beyond its normal range of movement, the linkage becomes effective to actuate wedge element 47 to its brake applying position. This linkage is typically represented as comprising a bell crank 63 which is pivotable about the axis of a shaft 64, and is engaged and actuated by a lug 65 on the pedal. The shaft 64 is also rotatable by emergency control lever 12 in a direction for actuating bell crank 63, cable 56, and element 47.

The portion 146 of recess 46 has a substantially greater width in the direction of movement of pins 51 than does element 47, to allow for a substantial lateral or transverse shifting movement of element 47 within recess 46 (see Figs. 4 and 5). This lateral movement of element 47 and the engaged pins 51 is sufficient to allow either of the shoe surfaces 123 to engage stop member 34 while the other shoe is actuated away from member 34 by wedge element 47 to braking position. The size of reduced portion 246 of passage 46 is also sufficiently great as compared to the size of portion 55 of element 47, to allow for the desired lateral shifting movement of element 47. The end of recess 46 may be closed by a cap 66 threaded onto element 34.

Springs 31 and 32 may be attached at first ends 67 to shoes 14 and 15 respectively, while the second ends of the springs are connected into opening 68 in a guide plate 69 which is disposed about member 34 and rigidly secured thereto, as by welding at 70. Plate 69 may have two oppositely extending portions extending in the directions of and alongside pins 51 respectively, and having guide surfaces 71 laterally engageable with outer sides of the webs 23 of shoes 14 and 15, to slideably guide the upper ends of the shoes as they move toward and away from each other. Preferably, plate 69 contains a pair of partial cylindrical recesses 72 movably receiving portions of pins 51. The pins 51 of course act against the shoes by engagement of end walls or shoulders 73 of slots 52 with the end surfaces 123 of the shoes.

During normal operation of the vehicle, the brakes are applied by depression of pedal 11 through a predetermined range of movement, to communicate an actuating hydraulic pressure from master cylinder 30 to the piston and cylinder mechanism 28 in the brake. Movement of the pedal through this normal range does not bring lug 65 into engagement with bell crank 63, and therefore wedge element 47 remains in its leftward inactive position as seen in Figs. 3 and 4. If the hydraulic system fails, however, pedal 11 moves beyond that normal range of movement, and engages bell crank 63 to exert a pulling force on cable 56, and thus actuate wedge element 47 to the right as seen in Figs. 3 and 4 in a manner wedging pins 51 and the engaged upper ends of the shoes relatively apart to bring the friction surfaces 22 of the shoes into braking engagement with drum 13. Also, by virtue of the connection of emergency hand lever 12 to shaft 64, the wedge actuating mechanism may be operated by the emergency brake lever.

If drum 13 is turning in a clockwise direction as seen in Fig. 2 when wedge element 47 is actuated to braking position, the end surface 123 of shoe 14 remains in engagement with surface 35 of stop member 34, while the actuation of the wedge 47 serves through pins 51 to wedge the upper end of the other shoe 15 away from engagement with surface 35, so that the brake has a self energizing action. If the direction of rotation of drum 13 is reversed, and wedge element 47 is then actuated, the upper end of shoe 15 remains in abutting engagement with stop surface 35, while the other shoe 14 is actuated away from the stop member, so that the brake in this reverse direction also has a self energizing action. Such self energization in either direction is only possible because of the permitted lateral or transverse shifting movement of wedge element 47 within recess 46, which allows either shoe to engage stop member 34 while the other shoe is actuated to braking position. This is considered to be an extremely important feature of the invention. Also of importance is the fact that the cable actuation of element 47 eliminates the necessity for the usual levers which are provided for emergency operation of the brake. Further, it is noted that the entire cable unit is very easily hermetically sealed to prevent the entry of dust or the like into the interior of the operating mechanism.

I claim:

1. Brake mechanism comprising a rotatable brake drum, a mounting plate extending across one side of said drum, a pair of shoes movably mounted within said drum at a first side of said plate and interconnected at first ends for relative swinging movement into and out of engagement with the drum, a fluid pressure operated primary operating unit acting to actuate said shoes against the drum, a rigid tubular stop member stationarily attached to and projecting from said plate generally parallel to the axis of said drum and engageable at opposite sides by the second ends of said shoes to retain the shoes against rotation, a wedge element movable axially within said stop member and operable by said movement to actuate said second ends of the shoes relatively apart and into braking engagement with the drum and means forming an actuating connection between said wedge element and each of said shoes through an aperture in said stop member for actuating the shoes in response to said axial movement of the wedge element, said wedge element being free for sufficient lateral movement within and transversely relative to said stop member to permit actuation of said shoes by said wedge element to braking condition with either of said shoes in bearing engagement with the stop member while the other shoe is actuated away therefrom, to thereby allow for self energization of the brake in either direction when actuated by said element, said tubular stop member extending through an aperture in said plate and projecting both from said first side of the plate and from its second side, a nut threadedly connected onto said stop member at said second side of the plate to secure the stop member on the plate, said stop member containing a passage extending axially therein through said plate and to both sides thereof and containing said wedge element at the first side of the plate, and means for actuating said wedge element extending through said passage in the tubular stop member to said second side of the plate and movable axially of the stop member to actuate the wedge element.

2. Brake mechanism as recited in claim 1, including two actuating pins movably extending through a pair of apertures in opposite sides of said stop member for actuating said shoes in response to axial movement of the wedge element and movable laterally with said wedge element.

3. Brake mechanism as recited in claim 1, including a guide flange extending about and projecting laterally in opposite directions from said stop member and engaging and laterally guiding said second ends of the shoes.

4. Brake mechanism as recited in claim 3, including a pair of retracting springs connected to the shoes respectively and to said guide member for retracting the shoes.

5. Brake mechanism as recited in claim 1, in which said actuating means comprise a flexible cable connected to said wedge element for actuating it axially and extending through said tubular stop member to said second side of the plate.

6. Brake mechanism as recited in claim 1, including two shoe displacing units movably extending through a pair of apertures in opposite sides of said stop member for actuating said shoes in response to axial movement of the wedge element and movable laterally with said wedge element, said wedge element having two cam recesses in its opposite sides into which said units project and contoured to cam said units laterally of the wedge element upon axial movement of the latter.

7. Brake mechanism as recited in claim 6, in which each of said shoe displacing units includes an axially movable pin having a socket recess in its inner end within which there is rotatably received a ball bearing which engages the wedge element.

References Cited in the file of this patent

UNITED STATES PATENTS

| 2,022,254 | Pentz | Nov. 26, 1935 |
| 2,095,753 | La Brie | Oct. 12, 1937 |
| 2,140,741 | Goepfrich | Dec. 20, 1938 |